Patented July 15, 1952

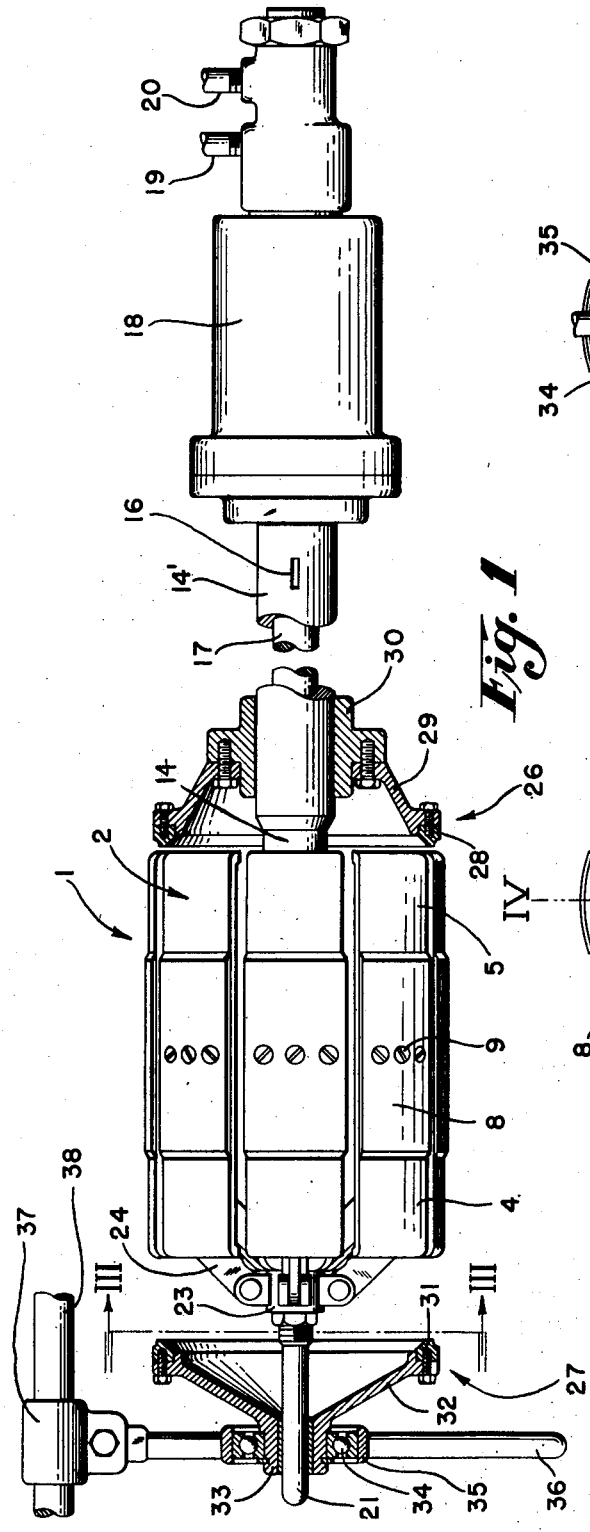
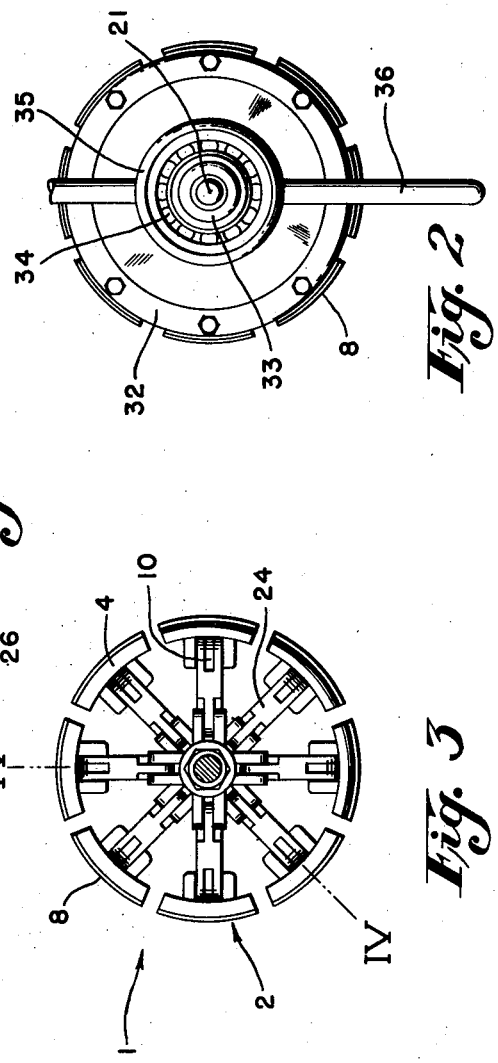
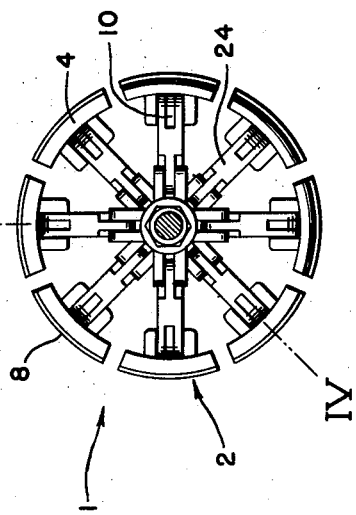
*INVENTOR.*
ANTHONY R. DI CICCO
DONALD E. ERICSON
BY Henry P. Truesdell
*ATTORNEY.*

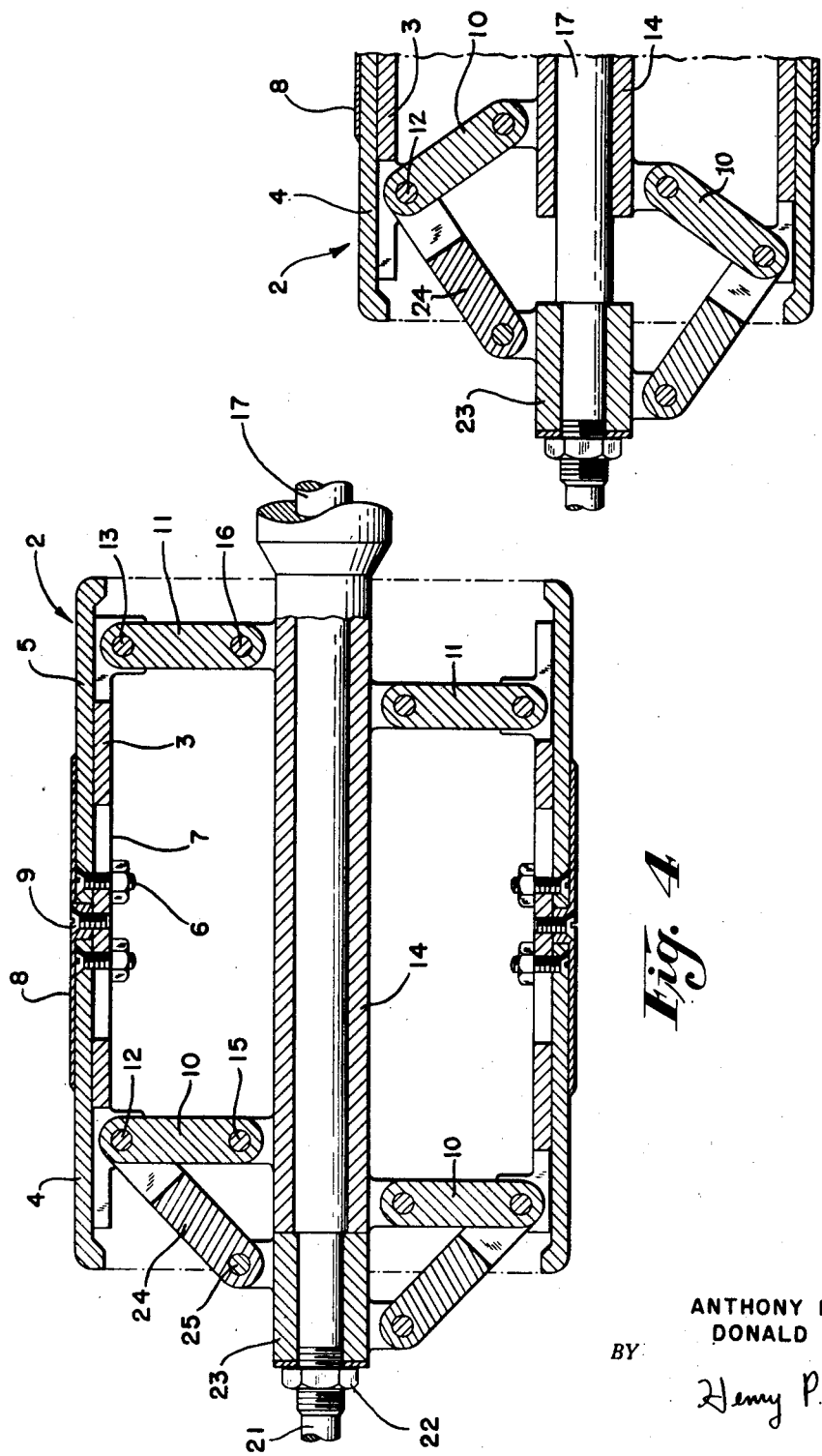

2,603,580

UNITED STATES PATENT OFFICE 2,603,580

TIRE BUILDING DRUM

Anthony R. Di Cicco and Donald E. Ericson, Detroit, Mich., assignors to United States Rubber Company, New York, N. Y., a corporation of New Jersey Application July 7, 1949, Serial No. 103,395

4 Claims. (Cl. 154—9)

This invention relates to tire building drums and particularly to a tire building drum on which to build small rim diameter pneumatic tires according to the well known flat band method.

One of the particular requirements for tire building drums is that the drum be collapsible so that tire components may be assembled over the drum and so that the completed tire may be removed from the drum. Most conventional types of tire building drums include a collapsible mechanism whereby different segments of the drum collapse progressively in succession until the drum is sufficiently small in diameter to permit a removal of an assembled tire therefrom. On small diameter drums, it is difficult to collapse the segments by conventional methods because of the lack of space into which the segments may be displaced.

In accordance with our invention, we provide a drum comprising a plurality of segments each of which is spaced from a central hub by a pair of pivoted arms and these arms in turn are connected to a link which through axial movement of a central shaft connecting the links functions to collapse each segment simultaneously and to a uniformly reduced diameter. In order to accomplish this collapsing feature, it is essential that the supporting arms or adjacent segments be offset, and that each arc of the segments be less than that arc of the segment which would otherwise produce a complete circumference. In other words, there is a gap between adjacent segments when the drum is in its operating or expanded position. When the drum is collapsed, the adjacent segments move together to close the gap. It has been found that this gap between segments is not objectionable, insofar as stitching requirements are concerned, in building up the plies and tread of the tire. Also included in combination with the drum is a pair of bead setting rings adapted to hold tire beads and to move the beads axially relative to the drum during the tire building operation. A pneumatic cylinder is employed for purposes of collapsing and expanding the drum.

Among the objects and advantages of our invention are to provide a drum in which each of the segments are substantially identical as well as the link mechanism associated therewith; to provide a drum which is rigid in construction and which is capable of maintaining a uniformly accurate outer diameter; to provide such a drum which may be collapsed or expanded by pneumatic or hydraulic means; to provide such a drum which is capable of adjustment in width without affecting the operating structure of the drum; to provide such a tire building drum which readily cooperates with axially disposed bead setting rings; and to provide such a drum which operates efficiently and which may be manufactured economically. These and other objects and advantages will appear more fully in the following detailed description when considered in connection with the accompanying drawings, in which:

Figure 1 is a side elevational view, partly in section, illustrating the drum forming an embodiment of our invention;

Fig. 2 is an end elevational view thereof;

Fig. 3 is a transverse view, in section, of an end view of the drum taken along lines III—III of Figure 1;

Figure 4 is an enlarged longitudinal and sectional view of the tire building drum taken along lines IV—IV of Figure 3; and, Figure 5 is a similar view of a portion of the drum illustrating the drum with its segments in collapsed position.

With reference to the drawing and, in particular, to Figure 1, we show an embodiment of our invention in the form of a tire building drum 1. Essentially the drum 1 comprises a plurality of arcuate or curved segments 2. Each segment includes a body member 3 (Figure 4) and drum surface members 4 and 5 in the form of arcuate shaped plates attached to the body member 3. These members are attached to the body member 3 by means of machine bolts 6 extending through a slot 7 in the body member 3. By this arrangement, it is possible to slide the drum surface members 4 and 5 over the surface of the body member 3 so as to vary the width of the drum. When the drum surface members are extended a gap will appear at the central portion of the drum. This is covered by means of a thin shield 8 lying on top of the drum surface members and attached to the body member 3 by means of a machine screw 9.

Each of the segments 2 is supported by links 10 and 11 attached to the body member 3 by means of pins 12 and 13, respectively. The opposite ends of the links 10 and 11 are pivotally attached to a tubular shaft 14 by means of pins 15 and 16, respectively. The tubular shaft 14 functions as the main driving support for the drum (Figures 1 and 4). An enlarged end 14' of the tubular shaft 14 is supported by conventional bearings and a conventional stand which houses driving means for rotating the drum. A suitable pulley or gear (not shown) may be attached to the enlarged end 14' of the shaft 14 by means of the keyway 16. Since the links 10 and 11 are relatively wide, as measured circumferentially, and since the tubular shaft 14 is relatively small, it is necessary to offset the links associated with adjacent segments. As shown in Figure 4, it will be noted that the links 10 and 11 which support the upper segment and similar links supporting the lower segment are at different longitudinal positions along the tubular shaft 14. By this arrangement, it is possible to accommodate a greater number of links around the sleeve 14. The position of the various adjacent links is more clearly shown in Figure 3.

Extending axially through the tubular shaft 14 is a rod 17 mounted for reciprocal movement within the shaft 14. In order to move the shaft in an axial direction, we provide a conventional type of double actuating fluid operable cylinder 18. This cylinder includes inlet and outlet conduits 19 and 20 through which fluid pressure is conducted. An example of a fluid operating cylinder of this type is shown in a patent to Olson, No. 1,544,679, dated July 7, 1925.

The shaft 17 connects with the piston in the cylinder 18 and extends throughout the length of the tubular shaft 14 terminating with an open end projecting shaft 21. Attached to the shaft 17 and held in place by means of a shoulder on the shaft and a nut 22 is a hub 23. To this hub is attached a plurality of arms 24 pivotally connected to the hub at 25 and also pivotally connected to the pins 12 which support the links 10. Axial outward movement of the shaft 17 by means of the cylinder 18 causes the arms 24 to move outwardly carrying the links 10 therewith. As a result of this movement, the drum segments 2 are caused to collapse to a position as shown in Figure 5. In this collapsed position, the gaps between the segments 2 (Figure 3) are closed and the drum becomes sufficiently reduced in diameter so that tire components may be removed therefrom. Similar to the links 10, the arms 24 are attached to the hub 23 so that adjacent arms are offset relative to each other, thus enabling a greater number of arms to be supported on the relatively small diameter hub 23.

As an additional feature associated with the drum, we provide bead supporting means 26 and 27. The bead supporting means 26 comprises essentially a bead supporting ring 28 supported by a cone-shaped flange 29 attached to a hub 30 which is axially slidable on the enlarged portion 14' of the shaft.

The bead supporting means 27 at the opposite end of the drum includes a bead supporting ring 31 held in position by a flange 32. This flange 32 includes a hub 33 which is slidable on the extension shaft 21. Attached to the outside of the hub 33 is a bearing 34 and a retainer 35. A hand arm 36 is attached to the retainer 35 and also engages a hub 37 axially slidable on a shaft 38 positioned in parallel relationship with the shaft 21. The shaft 38 is held in a fixed position by the main drum supporting structure, not shown.

In the operation of the drum, the cylinder 18 is actuated so as to collapse the segments of the drum. The bead supporting means 27 is moved axially off of the shaft 21. At this time, the tire building operator slides over the collapsed drum a bead wire which is positioned onto the bead supporting ring 28. The bead supporting means 26 is then moved axially along the enlarged portion 14' and away from the drum a distance sufficient so as not to interfere with other tire components about to be assembled on the drum. The drum is now expanded and various tire plies are wrapped around the drum. At the proper period in the manufacturing cycle, the bead supporting means 26 is moved by hand axially along the enlarged portion 14' so that the tire beads supported thereon engages the plies positioned on the drum. Also, a bead element is placed onto the bead ring 31 and the bead supporting means 27 by means of the arm 36 is caused to slide along the shafts 38 and 21 until the tire bead supported by the ring 31 engages the tire components assembled onto the drum. When the tire beads are secured by means of a stitching operation to the other tire elements on the drum, the bead supporting means 26 and 27 are moved out of position and the remaining components of the tire are assembled onto the drum. When this operation is complete, the cylinder 18 is actuated to collapse the segments of the drum. This allows sufficient clearance for the removal of the assembled tire, and the drum is now in position for repeating a similar cycle of operation.

Having thus described our invention, what we claim and desire to protect by Letters Patent is:

1. A tire building drum comprising, a plurality of spaced arcuate segments collectively describing a contiguous circle, a hollow shaft, at least two, spaced, parallel links pivotally attached at one of their ends to each segment and at their other end to said hollow shaft, a shaft extending axially through the hollow shaft, a hub attached to the shaft, an arm for each segment pivotally attached at one end to the segment end of one of said parallel links and at its other end to said hub, and means for moving said shaft axially of the hollow shaft, whereby said links are moved about their pivots and the segments collapsed to reduce the diameter of the drum.

2. A tire building drum comprising, a plurality of spaced arcuate segments collectively describing a contiguous circle, a hollow shaft, at least two, spaced, parallel links pivotally attached at one of their ends to each segment and at their other end to said hollow shaft, the links of each adjacent segment being attached to the hollow shaft at points longitudinally spaced from adjacent radially extending links, a shaft extending axially through the hollow shaft, a hub attached to the shaft, an arm for each segment pivotally attached at one end to the segment end of one of said parallel links and at its other end to said hub, each of said arms being pivotally attached to said hub at points longitudinally spaced from adjacent radially extending arms, and means for moving said shaft axially of the hollow shaft, whereby said links are moved about their pivots and the segments collapsed to reduce the diameter of the drum.

3. A tire building drum comprising, a hollow shaft, a plurality of spaced-apart body members disposed circumferentially and in spaced relation with the hollow shaft, a pair of arcuate plates attached to each body member to form collectively a contiguous circle, the body member and plate combination including a longitudinally extending slot and means engaging each slot to permit longitudinal adjustment of the plates relative to the body members, at least two, spaced, parallel links pivotally attached at one of their ends to each body member and at their other end to said hollow shaft, a shaft extending axially through the hollow shaft, a hub attached to the shaft, an arm for each body member pivotally attached at one end to the body member end of one of said parallel links and at its other end to said hub, and means for moving said shaft axially of the hollow shaft, whereby said links are moved about their pivots and the segments collapsed to reduce the diameter of the drum.

4. A tire building drum comprising, a plurality of arcuate segments collectively describing a contiguous circle, a hollow shaft, at least two, spaced parallel links pivotally attached at one of their ends to each segment and at the other end to said hollow shaft, a shaft extending axially through the hollow shaft, a hub attached to the shaft, an arm for each segment pivotally attached at one end to the segment end of one of said parallel links and at its other end to said hub, means for moving said shaft axially of the hollow shaft, whereby said links are moved about their pivots and the segments collapsed to reduce the diameter of the drum, a tire bead supporting ring mounted in free rotatable and slidable position over said hollow shaft and adapted to engage the rim of said segments, an extension rod having a free end and forming an extension of said shaft retained in the hollow shaft, and a second tire bead supporting ring mounted in free rotatable and slidable position over said extension rod and adapted to engage the opposite rim of said segments.

ANTHONY R. DI CICCO.
DONALD E. ERICSON.

REFERENCES CITED

The following references are of record in the file of this patent:

UNITED STATES PATENTS

| Number | Name | Date |
| --- | --- | --- |
| 142,746 | Smith | Sept. 9, 1873 |
| 867,431 | Simpson | Oct. 1, 1907 |
| 1,029,024 | Murray | June 11, 1912 |
| 1,434,567 | Smith et al. | Nov. 7, 1922 |
| 1,454,995 | Denmire | May 15, 1923 |
| 2,514,215 | Stevens et al. | July 4, 1950 |